(12) United States Patent
Baek (10) Patent No.: US 12,033,287 B2
(45) Date of Patent: Jul. 9, 2024

(54) VEHICLE HEAD-UP DISPLAY DEVICE AND METHOD

(71) Applicant: HYUNDAI MOBIS CO., LTD., Seoul (KR)

(72) Inventor: Jong Hyun Baek, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/969,346

(22) Filed: Oct. 19, 2022

(65) Prior Publication Data

US 2023/0154116 A1   May 18, 2023

(30) Foreign Application Priority Data

Nov. 17, 2021   (KR) .................. 10-2021-0158538
Nov. 17, 2021   (KR) .................. 10-2021-0158539

(51) Int. Cl.
*G06T 19/00* (2011.01)
*B60K 35/00* (2024.01)
(Continued)

(52) U.S. Cl.
CPC ............ *G06T 19/006* (2013.01); *B60K 35/00* (2013.01); *G02B 27/0101* (2013.01); *G09G 3/002* (2013.01); *H04N 13/00* (2013.01); *B60K 35/211* (2024.01); *B60K 35/23* (2024.01); *B60K 35/28* (2024.01); *B60K 2360/177* (2024.01); *B60K 2360/23* (2024.01); *B60K 2360/347* (2024.01); *B60R 2300/205* (2013.01); *G02B 5/045* (2013.01); *G02B 6/3528* (2013.01); *G02B 27/01* (2013.01); *G02B 2027/0134* (2013.01); *G02B 27/126* (2013.01); *G09G 2380/10* (2013.01)

(58) Field of Classification Search
CPC .................. G06T 19/006; B60K 35/00; B60K 2370/1529; B60K 2370/177; B60K 2370/1531; B60K 2370/23; B60K 2370/347; G02B 27/0101; G02B 2027/0134; G02B 6/3512; G02B 27/01; G02B 5/045; G02B 6/3528; G02B 27/126; G09G 3/002; G09G 2380/10; H04N 13/00; B60R 2300/205; B60R 2300/308
See application file for complete search history.

(56) References Cited

U.S. PATENT DOCUMENTS

2015/0226965 A1*  8/2015  Kim .................. G02B 30/30
                                                          359/462
2017/0242264 A1*  8/2017  Sissom ............. G02B 27/0172
(Continued)

FOREIGN PATENT DOCUMENTS

KR   10-2005-0010429 A    1/2005

*Primary Examiner* — Douglas M Wilson
(74) *Attorney, Agent, or Firm* — NovoTechIP International PLLC (57) ABSTRACT

A vehicle head-up display device may include a plurality of first image generation parts embedded in a vehicle body, and configured to provide flat and stereoscopic images in multiple directions, a first optical induction part configured to guide an image signal, provided by the first image generation parts, in one direction, and a first display part configured to implement the image signal, provided by the first optical induction part, as an image recognizable by a driver, thereby implementing augmented reality of a head-up display.

15 Claims, 10 Drawing Sheets

(51) Int. Cl.
*B60K 35/21* (2024.01)
*B60K 35/23* (2024.01)
*B60K 35/28* (2024.01)
*G02B 5/04* (2006.01)
*G02B 6/35* (2006.01)
*G02B 27/01* (2006.01)
*G02B 27/12* (2006.01)
*G09G 3/00* (2006.01)
*H04N 13/00* (2018.01)

(56) References Cited

U.S. PATENT DOCUMENTS

2020/0201036 A1* 6/2020 Hong .................... G02B 27/283
2022/0082736 A1* 3/2022 Fukase ................. G02B 27/102

* cited by examiner

VEHICLE HEAD-UP DISPLAY DEVICE AND METHOD

CROSS-REFERENCE TO RELATED APPLICATIONS

This application claims the benefits of priority to Korean Patent Application Nos. 10-2021-0158538 and 10-2021-0158539, filed on Nov. 17, 2021, of which the disclosure is incorporated herein by reference in their entirety.

TECHNICAL FIELD

Exemplary embodiments of the present disclosure relate to a vehicle head-up display device and method for implementing augmented reality, and more particularly, a vehicle head-up display device and method for implementing augmented reality, in which a plurality of image generation units can display a single image by superimposing a three-dimensional virtual image on a real image or background through an optical system.

BACKGROUND

In general, while a vehicle is driven, a driver drives checking vehicle information such as the driving speed of the vehicle, the rotation speed of an engine and the amount of fuel displayed on a front instrument panel. Since the front instrument panel is located in front of the driver's seat and the driver has to lower his/her eyes to check the vehicle information, it is not possible for the driver to continuously keep his/her eyes on the road, which increases the risk of an accident.

In order to solve this problem, a head-up display (hereinafter referred to as "HUD") device, which makes the vehicle information into an image, is mounted on the windshield glass of a vehicle, and consists of a projector that projects various pieces of information of a traveling vehicle, a reflector that reflects a projected image, and a projection mirror that projects the reflected image on the windshield glass. Since the image projected on the windshield glass is shown in front of the vehicle through driver's sight, the driver can observe the image together with the front view during driving.

However, since the conventional head-up display provides only a virtual image to the windshield glass, there is a problem in that it is not possible to provide information on a real image recognized by the driver's sight during driving. Accordingly, there is a need to solve the problem.

The background art of the present disclosure is disclosed in Korean Patent Application Laid-Open No. 10-2005-0010429 published on Jan. 27, 2005 and entitled "POSITIONING DEVICE FOR HEAD UP DISPLAY IMAGE."

SUMMARY

Various embodiments are directed to a vehicle head-up display device and method for implementing augmented reality, in which a plurality of image generation units may display a single image by superimposing a three-dimensional virtual image on a real image or background through an optical system.

In an embodiment, a vehicle head-up display device includes: a plurality of first image generation parts embedded in a vehicle body, and configured to provide flat and stereoscopic images in multiple directions; a first optical induction part configured to guide an image signal, provided by the first image generation parts, in one direction; and a first display part configured to implement the image signal, provided by the first optical induction part, as an image recognizable by a driver.

The first image generation parts include: a first image unit disposed to face one side of the first optical induction part, and configured to provide the flat image; and a second image unit slantly disposed on another side of the first optical induction part, and configured to provide the stereoscopic image.

The first optical induction part includes: a first optical unit formed by bonding two triangular prisms coated with a transparent material, and configured to guide the images of the first and second image units in one direction; and a second optical unit configured to guide an image signal passing through first optical unit to the first display part.

A reflective coating layer is formed in a bonding region of the first optical unit.

The first image generation parts include: a fifth image unit disposed to face one side of the first optical induction part, and configured to provide the flat image; a sixth image unit disposed to face another side of the first optical induction part, and configured to provide the flat image; and a seventh image unit slantly disposed on still another side of the first optical induction part, and configured to provide the stereoscopic image.

The first optical induction part includes: a fifth optical unit formed by bonding four triangular prisms coated with a transparent material, and configured to guide the images of the fifth to seventh image units in one direction; and a sixth optical unit configured to guide an image signal passing through the fifth optical unit to the first display part.

A reflective coating layer is formed in a bonding region of the fifth optical unit.

A distance between the fifth image unit and the fifth optical unit is different from a distance between the sixth image unit and the fifth optical unit.

The distance between the fifth image unit and the fifth optical unit and the distance between the sixth image unit and the fifth optical unit are movement distances of light.

In an embodiment, a vehicle head-up display device includes: a plurality of second image generation parts embedded in a vehicle body, and configured to provide flat and stereoscopic images; a second optical induction part configured to guide an image signal provided by the second image generation parts; and a second display part configured to implement the image signal, provided by the second optical induction part, as an image recognizable by a driver.

The second image generation parts include: a first generation unit disposed to face the second optical induction part, and configured to provide the flat image; and a second generation unit slantly disposed on the second optical induction part, and configured to provide the stereoscopic image.

The first generation unit and the second generation unit are disposed in up and down directions.

The second optical induction part includes: a first lens unit configured to reflect an image signal, which is provided by the first generation unit, downwards; a second lens unit disposed below the first lens unit, and configured to transmit light reflected by the first lens unit and reflect an image signal, which is provided by the second generation unit, downwards; and a third lens unit configured to guide the image signal passing through the second lens unit to the second display part.

The first generation unit and the second generation unit are disposed in left and right directions.

The second optical induction part includes: a fifth lens unit configured to reflect an image signal provided by the second generation unit; a sixth lens unit disposed in front of the fifth lens unit, and configured to transmit light reflected by the fifth lens unit and reflect an image signal, which is provided by the first generation unit, forward; and a seventh lens unit configured to guide the image signal passing through the sixth lens unit to the second display part.

In an embodiment, a vehicle head-up display method includes: an image providing step in which a plurality of image generation parts embedded in a vehicle body provide flat and stereoscopic images; an image inducing step in which an optical induction part guides an image signal provided by the image generation parts; and an image implementing step in which a display part implements the image signal, provided by the optical induction part, as an image recognizable by a driver.

In a vehicle head-up display device and method according to the embodiments of the present disclosure, image generation parts provide a flat image recognized as a near image and a stereoscopic image recognized as a far image, which makes it possible to implement augmented reality in a head-up display.

Effects of the present disclosure are not limited to the aforementioned effects, and may include various effects within a range evident to those skilled in the art from the following description.

DETAILED DESCRIPTION

Hereinafter, a vehicle head-up display device and method will be described below with reference to the accompanying drawings through various exemplary embodiments. In such a process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 1:
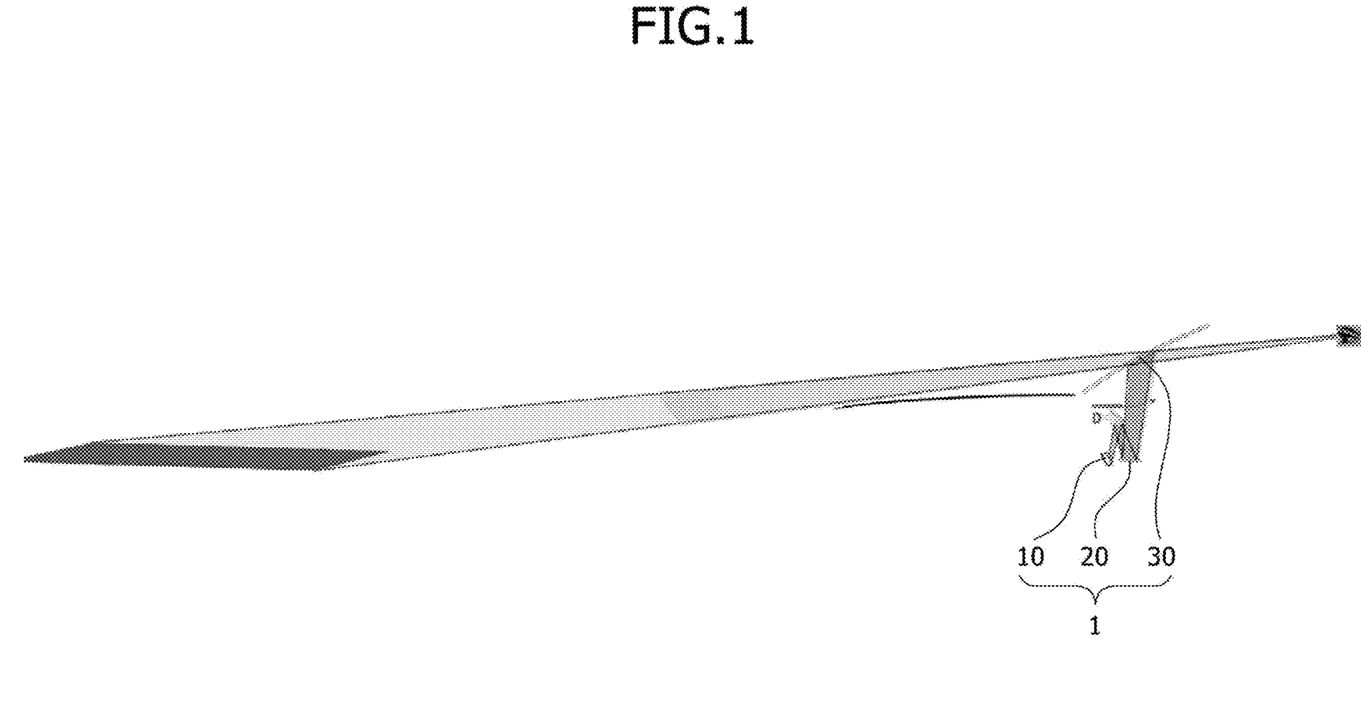
FIG. 1 is a diagram schematically illustrating a vehicle head-up display device according to a first embodiment of the present disclosure.

FIG. 1 is a diagram schematically illustrating a vehicle head-up display device 1 according to a first embodiment of the present disclosure. Referring to FIG. 1, the vehicle head-up display device 1 according to the first embodiment of the present disclosure includes a plurality of first image generation parts 10, a first optical induction part 20, and a first display part 30.

The plurality of first image generation parts 10 are disposed at or embedded in a vehicle body and provide flat and stereoscopic images in multiple directions. For example, picture generation units (PGU) may be used as the first image generation parts 10.

The first optical induction part 20 guides an image signal, which is provided by the first image generation parts 10, in one direction. For example, the first optical induction part 20 may guide the image signal from the inside of the vehicle body. The image signal guided from the inside of the vehicle body by the first optical induction part 20 may be moved to the outside of the vehicle body.

The first display part 30 implements the image signal, provided by the first optical induction part 20, as an image recognizable by a driver. For example, the first display part 30 may be formed on a front windshield. The vehicle head-up display device 1 may be modularized and mounted on the vehicle body, and the first display part 30 may be rotated to serve as a combiner for allowing the driver to recognize the image signal.

Figure 2:
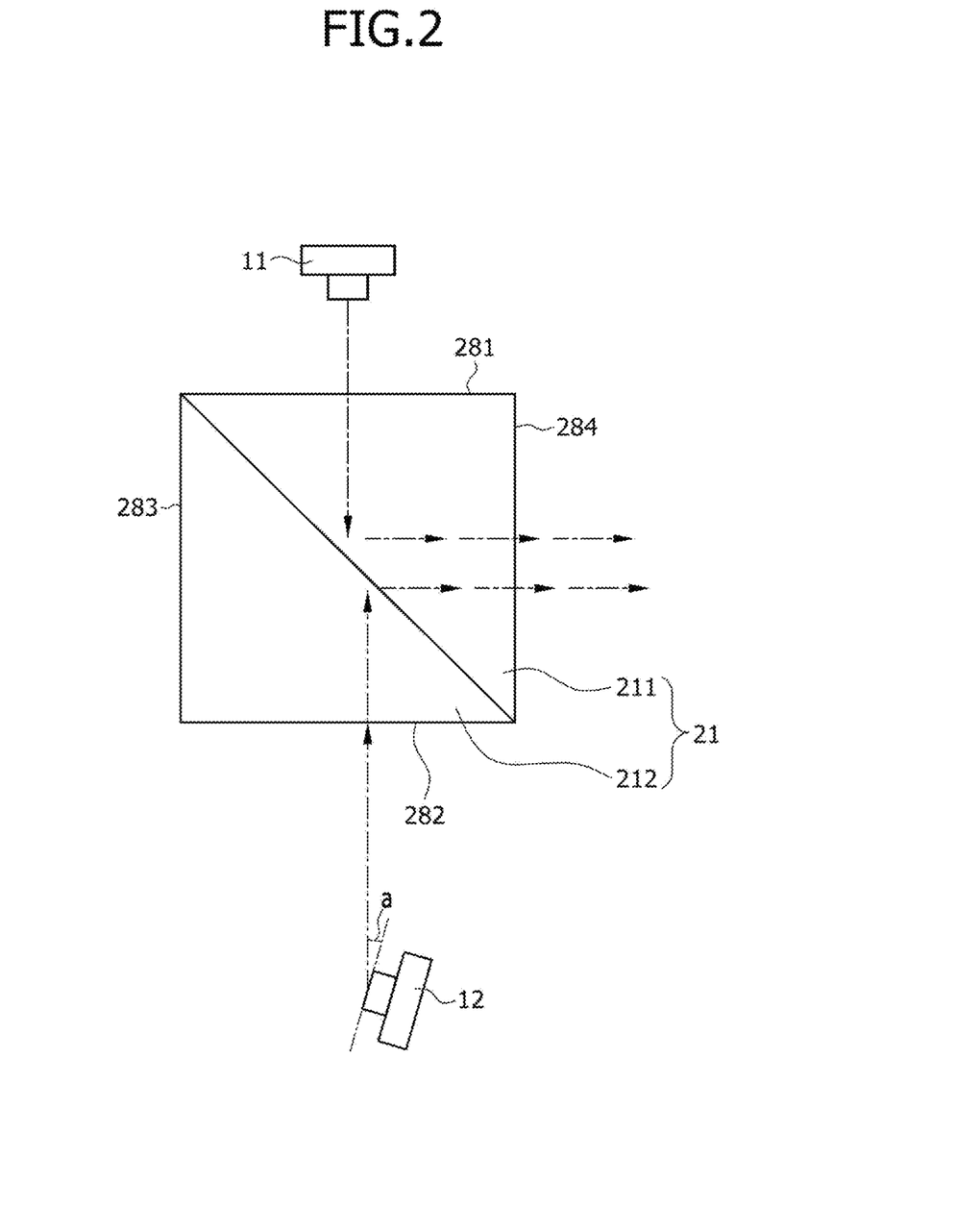
FIG. 2 is a diagram schematically illustrating a case in which there are two first image generation parts according to the first embodiment of the present disclosure.
Figure 3:
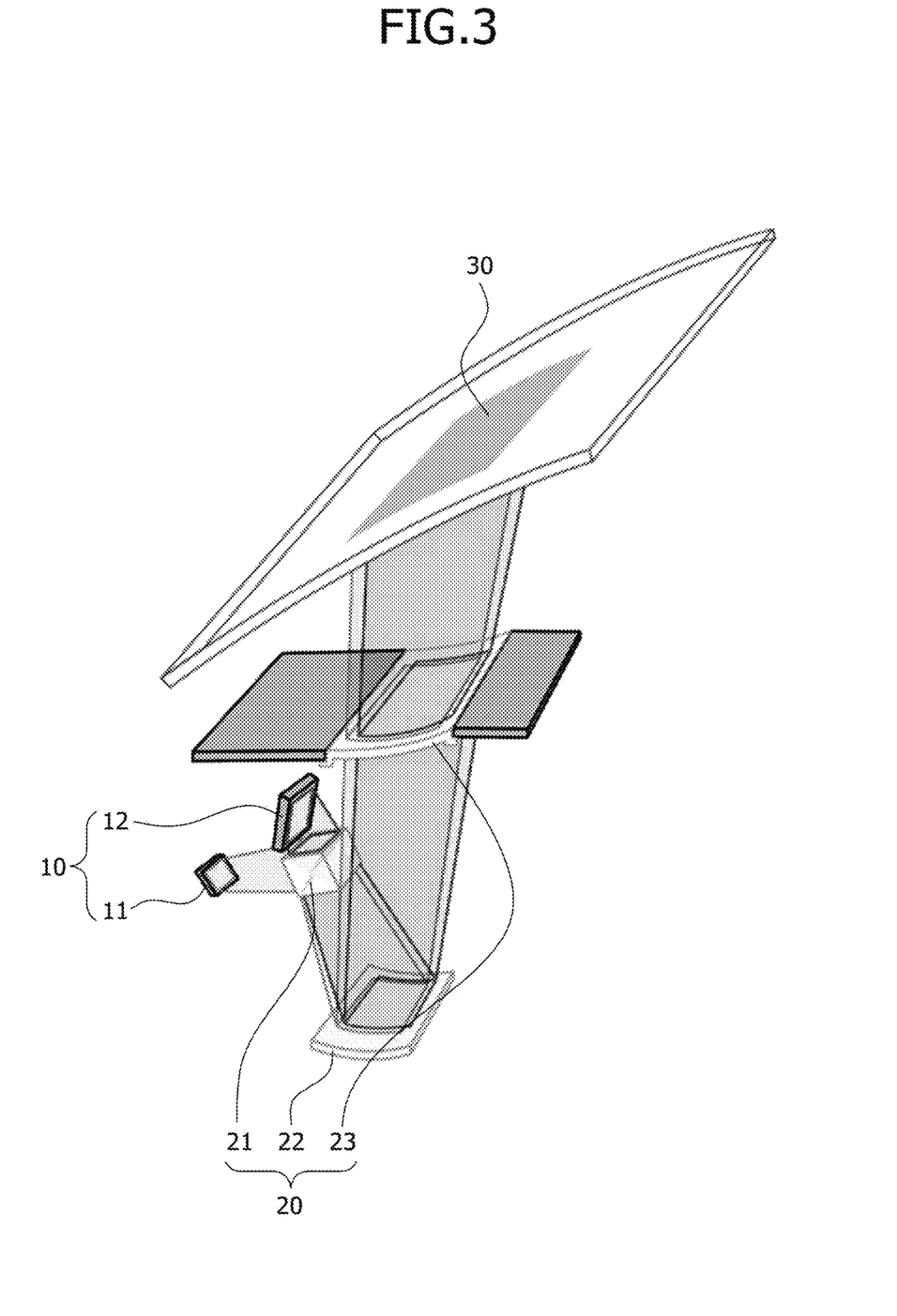
FIG. 3 is a diagram schematically illustrating a first optical induction part illustrated in FIG. 2.

FIG. 2 is a diagram schematically illustrating a case in which there are two first image generation parts 10 according to the first embodiment of the present disclosure, and FIG. 3 is a diagram schematically illustrating the first optical induction part 20 illustrated in FIG. 2. Referring to FIGS. 2 and 3, the first image generation parts 10 include a first image unit 11 and a second image unit 12.

The first image unit 11 is disposed to face one side of the first optical induction part 20 and provides the flat image. For example, the first image unit 11 may display a vehicle state. The vehicle state may be vehicle-related information, e.g., a speed gauge, a driving mode, a target reaching distance, etc., or a notification and state display, e.g., communication, an unexpected situation and a vehicle abnormal state.

The second image unit 12 is slantly disposed on another side of the first optical induction part 20 and provides the stereoscopic image. For example, the second image unit 12 may transmit a display image obliquely in a lateral direction rather than a front direction and give a sense of distance to the image. The second image unit 12 may display a road surface condition. In addition, the second image unit 12 may provide a navigation driving guide, e.g., a left turn, a right turn, a straight road, a speed limit, etc., or an active response display for driving environment, e.g., intervehicle distance maintenance, rear-end collision assistance, speed display of a preceding vehicle, etc.

The second image unit 12 may irradiate an optical signal so as to have a slope "a" with respect to the first optical induction part 20 by itself or through side-reflection in a state of being slantly disposed, not facing the first optical induction part 20. In this case, the slope "a" may be designed to be greater than 0 degree and less than 40 degrees. The driver may feel that the image provided by the second image unit 12 is farther than the image provided by the first image unit 11, and augmented reality may be implemented.

The first optical induction part 20 includes a first optical unit 21 and a second optical unit 22.

The first optical unit 21 is formed by boding two triangular prisms coated with a transparent material, and the first optical unit 21 guides the images of the first image unit 11 and the second image unit 12 in one direction. For example, the first optical unit 21 may be formed as a cube by conjoining or bonding a first mirror unit 211 and a second mirror unit 212 which are the triangular prisms. A reflective coating layer may be formed in a bonding region of the first mirror unit 211 and the second mirror unit 212. The reflective coating layer may guide reflection through aluminum deposition, guide refraction by using a UV refractive resin, and split light into orthogonal polarization states by using a birefringent material. In addition, the reflective coating layer may guide images, which are introduced in various directions, in one direction. The light introduced into a first surface 281 of the first mirror unit 211 may be reflected by the reflective coating layer and pass through a fourth surface 284 of the first mirror unit 211. The light introduced into a second surface 282 or a third surface 283 of the second mirror unit 212 may be refracted by the reflective coating layer and pass through the fourth surface 284 of the first mirror unit 211.

The second optical unit 22 guides the image signal passing through the first optical unit 21 to the first display part 30. For example, the second optical unit 22 may have a rounded shape and align the focus of the image signal reaching the first display part 30.

In addition, a third optical unit 23 is formed in an interior material, and is disposed below the first display unit 30 to transmit the image signal reflected by the second optical unit 22.

Figure 4:
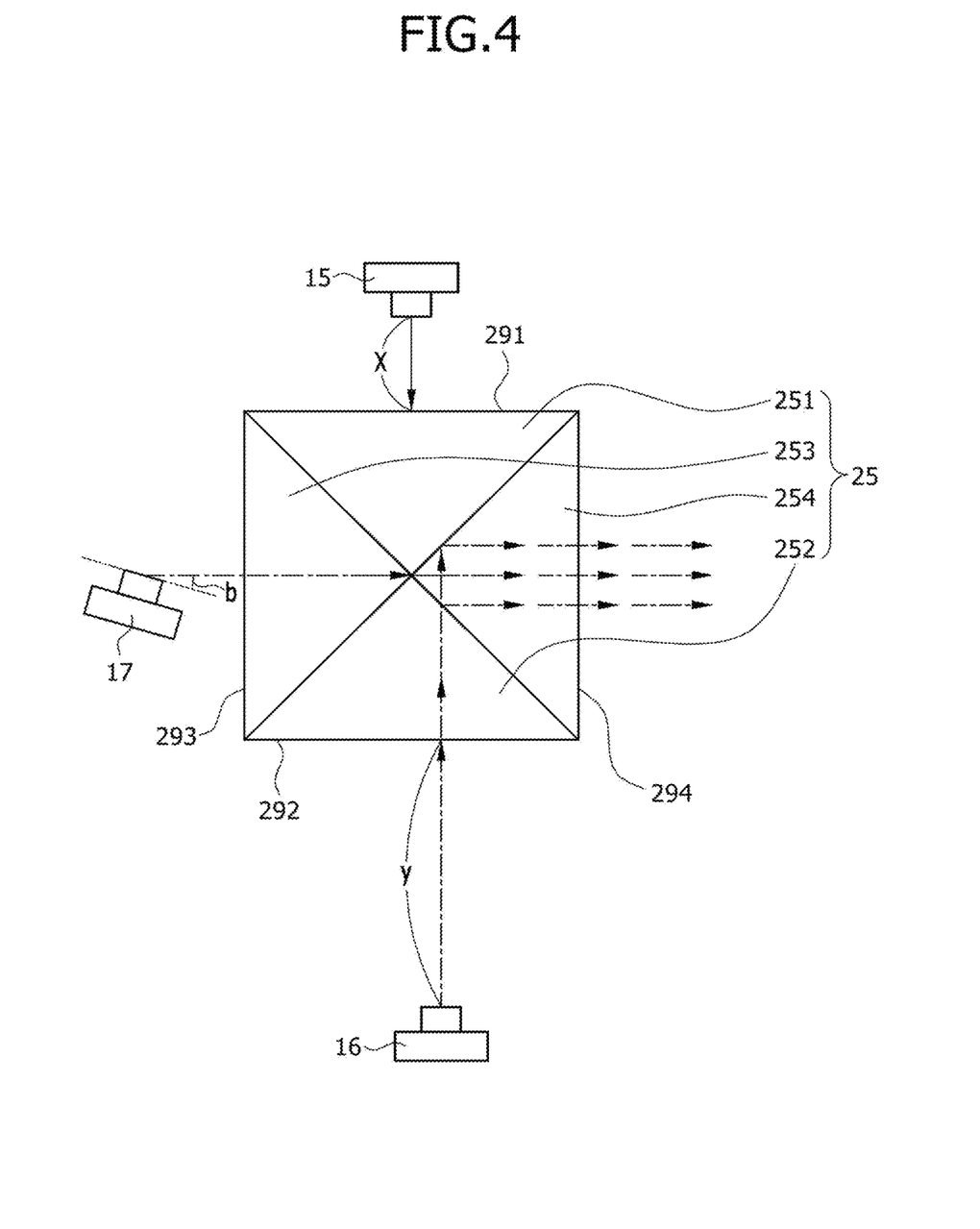
FIG. 4 is a diagram schematically illustrating a case in which there are three first image generation parts according to the first embodiment of the present disclosure.
Figure 5:
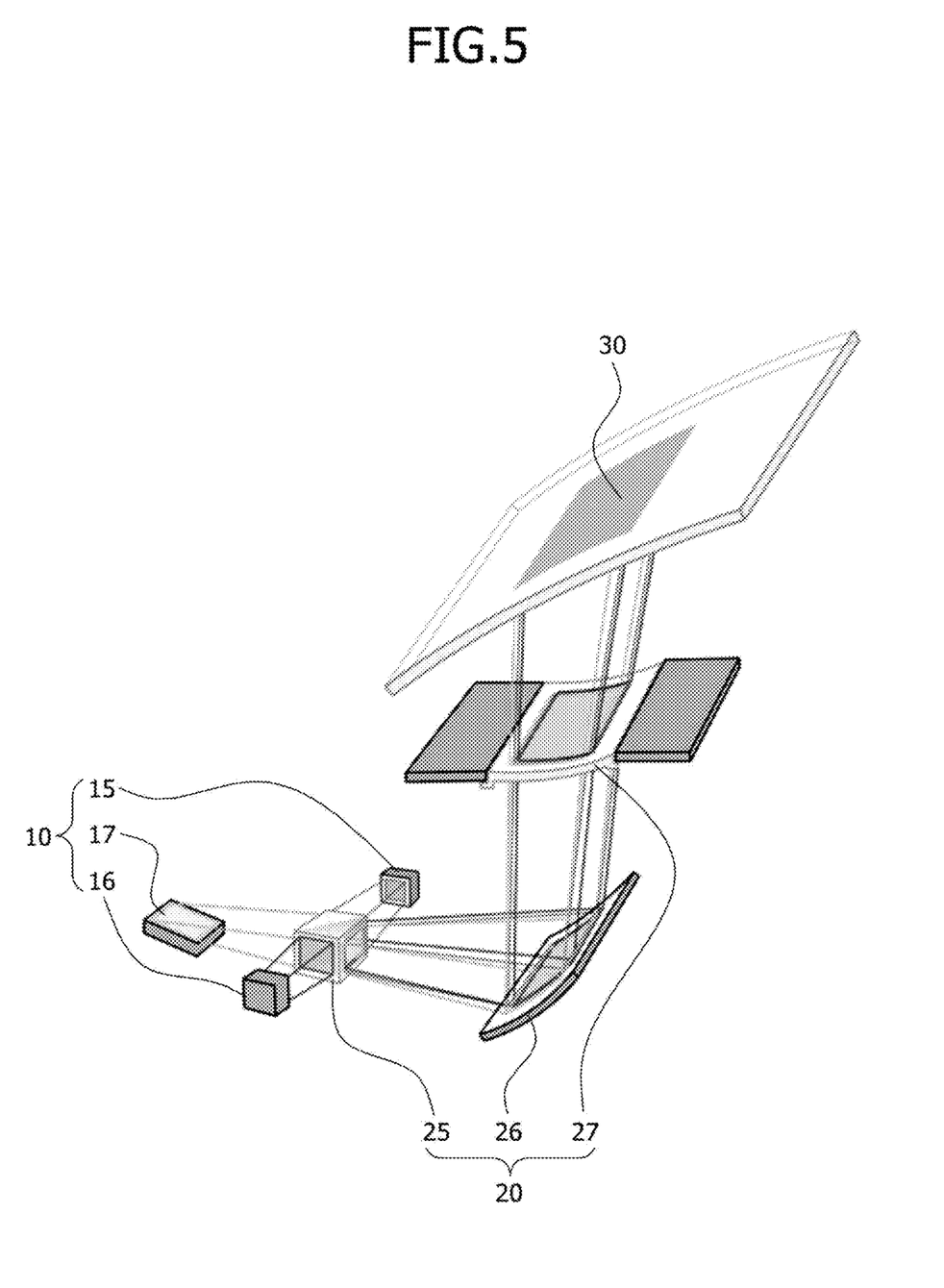
FIG. 5 is a diagram schematically illustrating a first optical induction part illustrated in FIG. 4.

FIG. 4 is a diagram schematically illustrating a case in which there are three first image generation parts 10 according to the first embodiment of the present disclosure, and FIG. 5 is a diagram schematically illustrating the first optical induction part 20 illustrated in FIG. 4. Referring to FIGS. 4 and 5, the first image generation parts 10 includes a fifth image unit 15, a sixth image unit 16, and a seventh image unit 17.

The fifth image unit 15 is disposed to face one side of the first optical induction part 20 and provides the flat image. For example, the fifth image unit 15 may display a vehicle state. The vehicle state may be vehicle-related information, e.g., a speed gauge, a driving mode, a target reaching distance, etc., or a notification and state display, e.g., communication, an unexpected situation and a vehicle abnormal state.

The sixth image unit 16 is disposed to face another side of the first optical induction part 20 and provides the flat image. For example, the sixth image unit 16 may display a vehicle state. The vehicle state may be vehicle-related information, e.g., a speed gauge, a driving mode, a target reaching distance, etc., or a notification and state display, e.g., communication, an unexpected situation and a vehicle abnormal state.

The seventh image unit 17 is slantly disposed on still another side of the first optical induction part 20 and provides the stereoscopic image. For example, the seventh image unit 17 may transmit a display image obliquely in a lateral direction rather than a front direction and give a sense of distance to the image. The seventh image unit 17 may display a road surface condition. In addition, the seventh image unit 17 may provide a navigation driving guide, e.g., a left turn, a right turn, a straight road, a speed limit, etc., or an active response display for driving environment, e.g., intervehicle distance maintenance, rear-end collision assistance, speed display of a preceding vehicle, etc.

The seventh image unit 17 may irradiate an optical signal so as to have a slope "b" with respect to the first optical induction part 20 by itself or through side-reflection in a state of being slantly disposed, not facing the first optical induction part 20. In this case, the slope "b" may be designed to be greater than 0 degree and less than 40 degrees. The driver may feel that the image provided by the seventh image unit 17 is farther than the images provided by the fifth and sixth image units 15 and 16, and augmented reality may be implemented.

The first optical induction part 20 includes a fifth optical unit 25 and a sixth optical unit 26.

The fifth optical unit 25 is formed by boding four triangular prisms coated with a transparent material, and the fifth optical unit 25 guides the images of the fifth to seventh image units 15 to 17 in one direction. For example, the fifth optical unit 25 may be formed as a cube by boding a first lens unit 251, a second lens unit 252, a third lens unit 253 and a fourth lens unit 254, which are triangular prisms. A reflective coating layer may be formed in bonding regions of the first lens unit 251, the second lens unit 252, the third lens unit 253 and the fourth lens unit 254. The reflective coating layer may guide reflection through aluminum deposition, guide refraction by using a UV refractive resin, and split light into orthogonal polarization states by using a birefringent material. In addition, the reflective coating layer may guide images, which are introduced in various directions, in one direction. The reflective coating layer may be selectively applied to guide an optical signal.

The first lens unit 251 and the second lens unit 252 are disposed to face each other, and the third lens unit 253 and the fourth lens unit 254 are disposed to face each other. Incident light introduced into the first lens unit 251 may be reflected and pass through the fourth lens unit 254. Incident light introduced into the second lens unit 252 may be reflected and pass through the fourth lens unit 254. Incident light introduced into the third lens unit 253 may pass through the fourth lens unit 254 facing the third lens unit 253.

The sixth optical unit 26 guides the image signal passing through the fifth optical unit 25 to the first display part 30. For example, the sixth optical unit 26 may have a rounded shape and align the focus of the image signal reaching the first display part 30.

In addition, a seventh optical unit 27 is formed in an interior material, and is disposed below the first display part 30 to transmit the image signal reflected by the sixth optical unit 26.

Meanwhile, a distance "x" between the fifth image unit 15 and the fifth optical unit 25 and a distance "y" between the sixth image unit 16 and the fifth optical unit 25 are different from each other. For example, when the distance "y" between the sixth image unit 16 and the fifth optical unit 25 is disposed to be longer than the distance "x" between the fifth image unit 15 and the fifth optical unit 25, the image provided by the sixth image unit 16 is perceived to be farther away than the image provided by the fifth image unit 15, which makes it possible to achieve a three-dimensional effect. The distance "x" between the fifth image unit 15 and the fifth optical unit 25 and the distance "y" between the sixth image unit 16 and the fifth optical unit 25 may refer to movement distances of light in addition to a distance between components. The movement distances of light may increase through light reflection.

Figure 11:
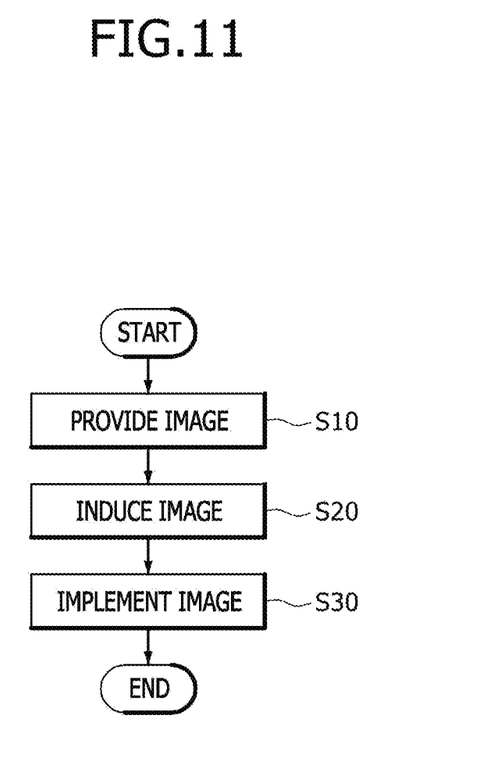
FIG. 11 is a flowchart schematically illustrating a vehicle head-up display method according to the present disclosure.

FIG. 11 is a flowchart schematically illustrating a vehicle head-up display method according to the present disclosure. Referring to FIG. 11, the vehicle head-up display method according to the present disclosure may include an image providing step S10, an image inducing step S20, and an image implementing step S30, and be implemented through the head-up display device 1 according to the first embodiment. Hereinafter, the image providing step S10 is represented as a first image providing step, the image inducing step S20 is represented as a first image inducing step, and the image implementing step S30 is represented as a first image implementing step. Image generation parts may be the first image generation parts 10, an optical induction part may be the first optical induction part 20, and a display part may be the first display part 30.

In the first image providing step S10, the plurality of first image generation parts 10 embedded in a vehicle body provide flat and stereoscopic images in multiple directions. For example, the first image generation parts 10 may include the first image unit 11 configured to provide the flat image and the second image unit 12 configured to provide the stereoscopic image. In this case, the second image unit 12 may irradiate an optical signal in an oblique direction and provide the stereoscopic image.

In the first image inducing step S20, the first optical induction part 20 guides image signals, provided by the first image generation parts 10, in one direction. For example, the first optical induction part 20 may implement images, provided by the plurality of first image generation parts 10, as a single screen by using a beam splitter. That is, the first optical induction part 20 has a cube shape by bonding a plurality of prisms, and when two or more first image generation parts 10 emit light to different surfaces of the first optical induction part 20 as necessary, the light may be moved to one side of the first optical induction part 20.

In the first image implementing step S30, the first display part 30 implements the image signal, provided by the first optical induction part 20, as an image recognizable by the driver. In this case, an image signal provided by the first image unit 11 may be recognized as a near image, and an image signal provided by the second image unit 12 may be recognized as a far image.

An operation of the vehicle head-up display device 1 having the above-described configuration according to the first embodiment of the present disclosure is described below.

When the first image unit 11 and the second image unit 12 irradiate the images to the first optical unit 21 (refer to FIGS. 2 and 3), the image signal of the first image unit 11 introduced into the first surface 281 of the first optical unit 21 passes through the fourth surface 284 of the first optical unit 21, is reflected upward by the second optical unit 22, and reaches the first display part 30. In this case, the driver may recognize the vehicle state provided by the first image unit 11. In addition, the image signal of the second image unit 12 introduced into the second surface 282 or the third surface 283 of the first optical unit 21 passes through the fourth surface 284 of the first optical unit 21, is reflected upward by the second optical unit 22, and reaches the first display part 30. In this case, the driver may recognize the road surface condition provided by the second image unit 12. Meanwhile, the driver may recognize that the image provided by the second image unit 12 is farther away than the image provided by the first image unit 11.

When the fifth image unit 15, the sixth image unit 16 and the seventh image unit 17 irradiate the images to the fifth optical unit 25 (refer to FIGS. 4 and 5), the image signal of the fifth image unit 15 introduced into a first surface 291 of the fifth optical unit 25 passes through a fourth surface 294 of the fifth optical unit 25, is reflected upward by the sixth optical unit 26, and reaches the first display part 30. In this case, the driver may recognize the vehicle state provided by the fifth image unit 15. In addition, the image signal of the sixth image unit 16 introduced into a second surface 292 of the fifth optical unit 25 passes through the fourth surface 294 of the fifth optical unit 25, is reflected upward by the sixth optical unit 26, and reaches the first display part 30. In this case, the driver may recognize the vehicle state provided by the sixth image unit 16. Lastly, the image signal of the seventh image unit 17 introduced to a third surface 293 of the fifth optical unit 25 passes through the fourth surface 294 of the fifth optical unit 25, is reflected upward by the sixth optical unit 26, and reaches the first display part 30. In this case, the driver may recognize the road surface condition provided by the seventh image unit 17. Meanwhile, the driver may recognize that the image provided by the seventh image unit 17 is farther away than the images provided by the fifth and sixth image units 15 and 16, and recognize perspective of the images due to a difference between the positions of the fifth image unit 15 and the sixth image unit 16 or between the movement distances of light.

In the vehicle head-up display device and method according to the first embodiment of the present disclosure, the first image generation parts 10 provide the flat image recognized as a near image and the stereoscopic image recognized as a far image, which makes it possible to implement augmented reality in a head-up display.

Figure 6:
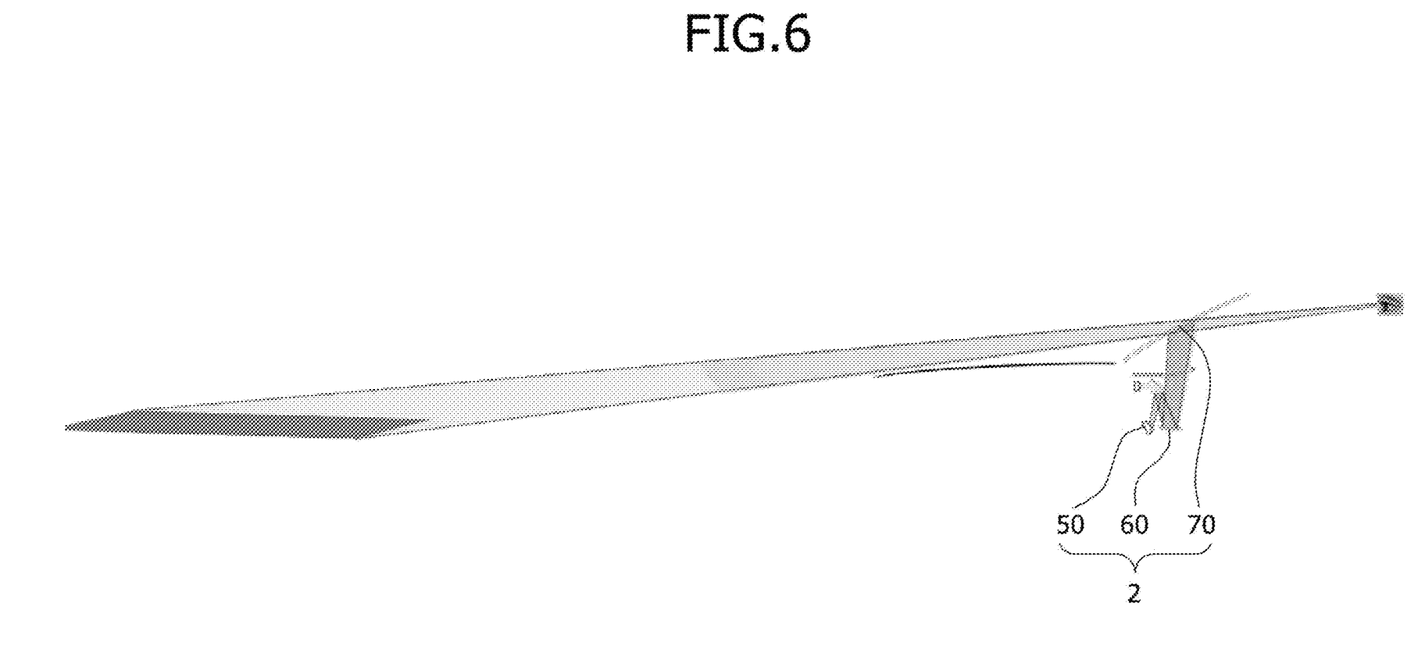
FIG. 6 is a diagram schematically illustrating a vehicle head-up display device according to a second embodiment of the present disclosure.

FIG. 6 is a diagram schematically illustrating a vehicle head-up display device 2 according to a second embodiment of the present disclosure. Referring to FIG. 6, the vehicle head-up display device 2 according to the second embodiment of the present disclosure includes a plurality of second image generation parts 50, a second optical induction part 60, and a second display part 70.

The plurality of second image generation parts 50 are embedded in a vehicle body and provide flat and stereoscopic images. For example, picture generation units (PGU) may be used as the second image generation parts 50.

The second optical induction part 60 guides an image signal, which is provided by the second image generation parts 50. For example, the second optical induction part 60 may guide the image signal from the inside of the vehicle body. The image signal guided from the inside of the vehicle body by the second optical induction part 60 may be moved to the outside of the vehicle body.

The second display part 70 implements the image signal, provided by the second optical induction part 60, as an image recognizable by a driver. For example, the second display part 70 may be formed on a front windshield. The vehicle head-up display device 2 may be modularized and mounted on the vehicle body, and the second display part 70 may be rotated to serve as a combiner for allowing the driver to recognize the image signal.

Figure 7:
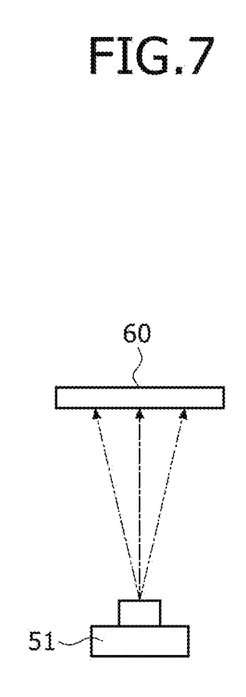
FIG. 7 is a diagram schematically illustrating a first generation unit according to the second embodiment of the present disclosure.
Figure 8:
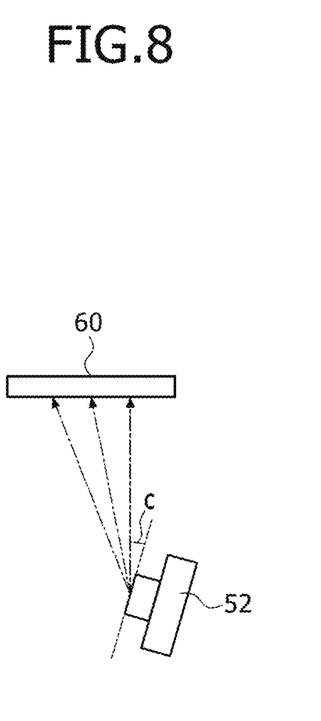
FIG. 8 is a diagram schematically illustrating a second generation unit according to the second embodiment of the present disclosure.

FIG. 7 is a diagram schematically illustrating a first generation unit 51 according to the second embodiment of the present disclosure, and FIG. 8 is a diagram schematically illustrating a second generation unit 52 according to the second embodiment of the present disclosure. Referring to FIGS. 7 and 8, the second image generation parts 50 include the first generation unit 51 and the second generation unit 52.

The first generation unit 51 is disposed to face the second optical induction part 60 and provides the flat image. For example, the first generation unit 51 may display a vehicle state. The vehicle state may be vehicle-related information, e.g., a speed gauge, a driving mode, a target reaching distance, etc., or a notification and state display, e.g., communication, an unexpected situation and a vehicle abnormal state.

The second generation unit 52 is slantly disposed on the second optical induction part 60 and provides the stereoscopic image. For example, the second generation unit 52 may transmit a display image obliquely in a lateral direction rather than a front direction and give a sense of distance to the image. The second generation unit 52 may display a road surface condition. In addition, the second generation unit 52 may provide a navigation driving guide, e.g., a left turn, a right turn, a straight road, a speed limit, etc., or an active response display for driving environment, e.g., intervehicle distance maintenance, rear-end collision assistance, speed display of a preceding vehicle, etc.

The second generation unit 52 irradiates an optical signal so as to have a slope "c" with respect to the second optical induction part 60 by itself or through side-reflection in a state of being slantly disposed, not facing the second optical induction part 60. In this case, the slope "c" may be designed to be greater than 0 degree and less than 40 degrees. The driver may feel that the image provided by the second generation unit 52 is farther than the image provided by the first generation unit 51, and augmented reality may be implemented.

Figure 9:
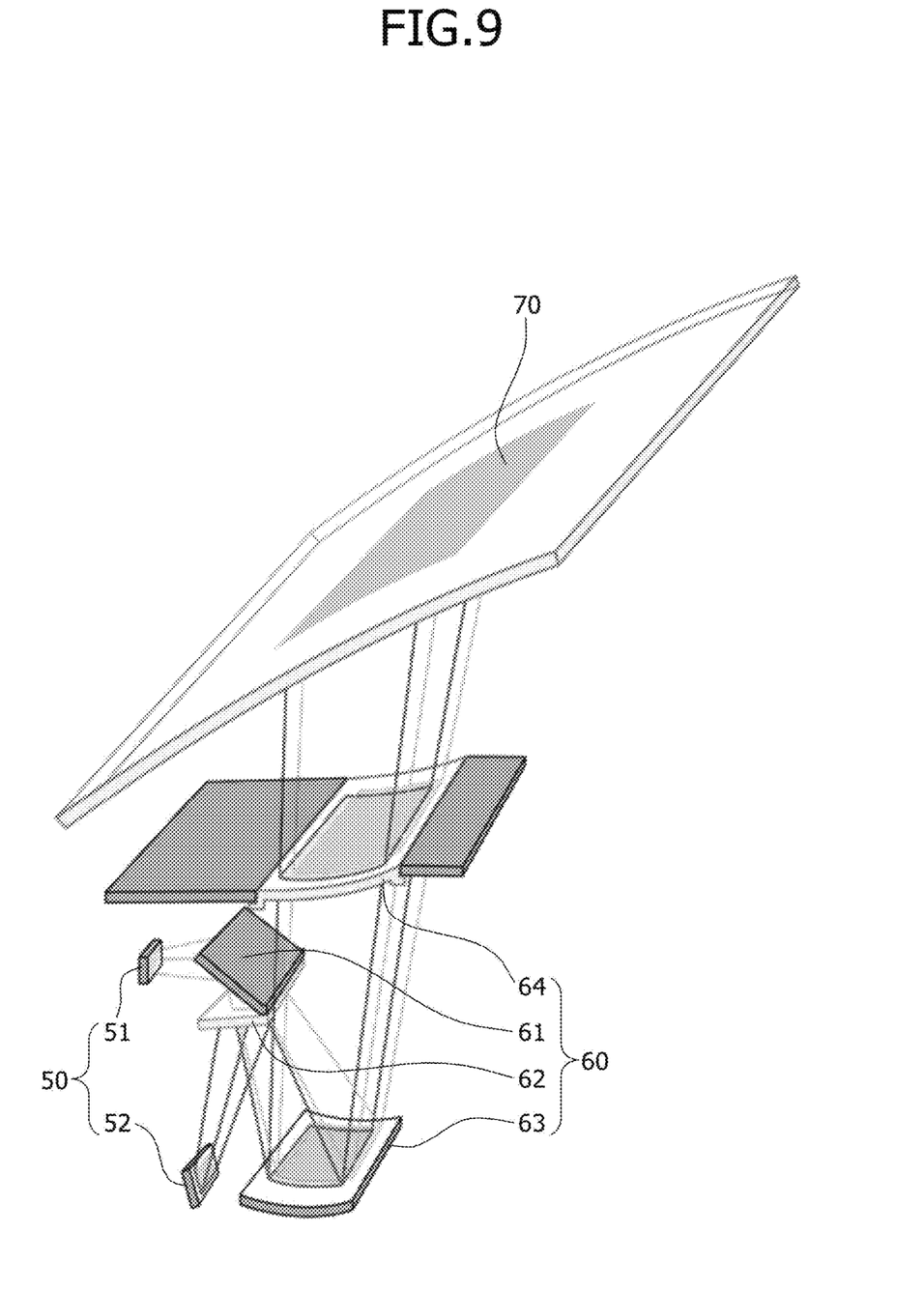
FIG. 9 is a diagram schematically illustrating an optical induction part when image generation parts according to the second embodiment of the present disclosure are disposed in up and down directions.

FIG. 9 is a diagram schematically illustrating the second optical induction part 60 when the second image generation parts 50 according to the second embodiment of the present disclosure are disposed vertically in up and down directions. Referring to FIG. 9, the first generation unit 51 and the second generation unit 52 are disposed in the up and down direction. In addition, the second optical induction part 60 includes a first lens unit 61, a second lens unit 62, and a third lens unit 63.

The first lens unit 61 reflects the image signal, provided by the first generation unit 51, downwards. For example, the first lens unit 61 may be disposed to face the first generation unit 51, and may be slantly disposed to reflect light to the second lens unit 62 disposed horizontally.

The second lens unit 62 is disposed below the first lens unit 61, and the second generator 52 is disposed below the second lens unit 62. The second lens unit 62 transmits the light reflected from the first lens unit 61. The second lens unit 62 downwardly reflects the image signal provided from the second generation unit 52. In this case, the second generation unit 52 may be disposed to have a slope, not facing the second lens unit 62, and achieve a three-dimensional effect through an optical signal irradiated obliquely in a lateral direction of the second generation unit 52.

The third lens unit 63 guides the image signal passing through the second lens unit 62 to the second display part 70. For example, the third lens unit 63 may have a rounded shape and align the focus of the image signal reaching the second display part 70.

In addition, a fourth lens unit 64 is formed in an interior material, and is disposed below the second display part 70 to transmit the image signal reflected by the third lens unit 63.

Figure 10:
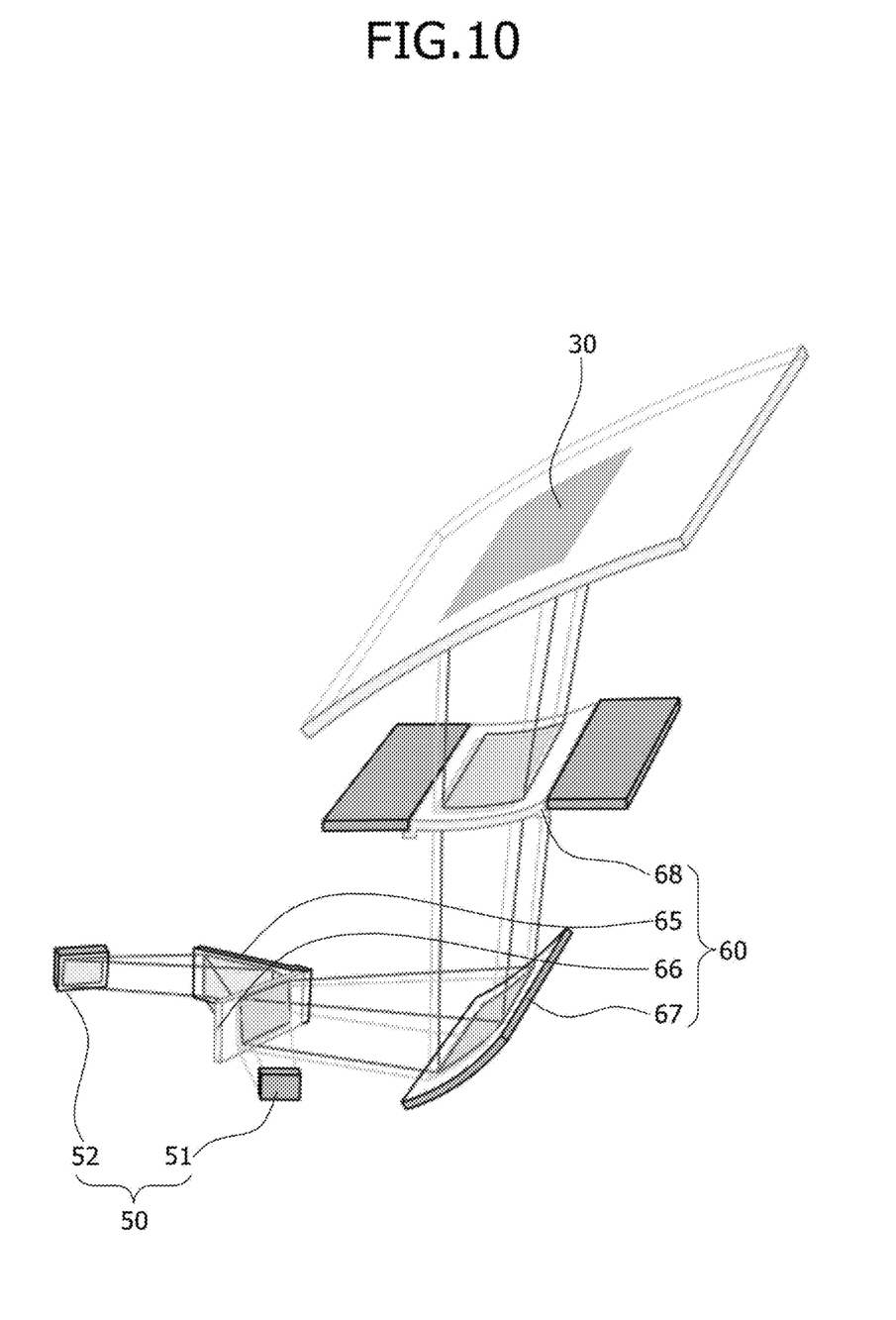
FIG. 10 is a diagram schematically illustrating an optical induction part when the image generating parts according to the second embodiment of the present disclosure are disposed in left and right directions.

FIG. 10 is a diagram schematically illustrating the second optical induction part 60 when the second image generation parts 50 according to the second embodiment of the present disclosure are disposed in left and right directions. Referring to FIG. 10, the first generation unit 51 and the second generation unit 52 are disposed in the left and right directions. The second optical induction part 60 includes a fifth lens unit 65, a sixth lens unit 66, and a seventh lens unit 67.

The fifth lens unit 65 reflects the image signal provided by the second generation unit 52. For example, the fifth lens unit 65 may be disposed in front of the second generation unit 52, and be slantly disposed to reflect light to the sixth lens unit 66. In this case, the second generation unit 52 may be disposed to have a slope, not facing the fifth lens unit 65, and achieve a three-dimensional effect through an optical signal irradiated obliquely in a lateral direction of the second generation unit 52. The fifth lens unit 65 may have a rounded shape so as to align the focus of the image signal.

The sixth lens unit 66 is disposed in front of the fifth lens unit 65, transmits the light reflected by the fifth lens unit 65, and reflects the image signal, which is provided by the first generation unit 51, forward. For example, the sixth lens unit 66 may be disposed to face the first generation unit 51 on the same horizontal line. In addition, the sixth lens unit 66 may be slantly disposed to reflect the light to the seventh lens unit 67.

The seventh lens unit 67 guides the image signal passing through the sixth lens unit 66 to the second display part 70. For example, the seventh lens unit 67 may be slantly disposed, and have a rounded shape to align the focus of the image signal reaching the second display part 70.

In addition, an eighth lens unit 68 is formed in an interior material, and is disposed below the second display part 70 to transmit the image signal reflected by the seventh lens unit 67.

Referring to FIG. 11, the vehicle head-up display method according to the present disclosure may include an image providing step S10, an image inducing step S20, and an image implementing step S30, and be implemented through the head-up display device 2 according to the second embodiment. Hereinafter, the image providing step S10 is represented as a second image providing step, the image inducing step S20 is represented as a second image inducing step, and the image implementing step S30 is represented as a second image implementing step. Image generation parts may be the second image generation parts 50, an optical induction part may be the second optical induction part 60, and a display part may be the second display part 70.

In the second image providing step S10, the plurality of second image generation parts 50 embedded in a vehicle body provide flat and stereoscopic images. For example, the second image generation parts 50 may include the first generation unit 51 configured to provide the flat image and the second generation unit 52 configured to provide the stereoscopic image. In this case, the second generation unit 52 may irradiate an optical signal in an oblique direction and provide the stereoscopic image.

In the second image inducing step S20, the second optical induction part 60 guides image signals provided by the second image generation parts 50. For example, the second optical induction part 60 may move image information of the first generation unit 51 and the second generation unit 52, which are in a state of being disposed up and down, to the second display part 70. In addition, the second optical induction part 60 may move image information of the first generation unit 51 and the second generation unit 52, which are in a state of being disposed left and right, to the second display part 70.

In the second image implementing step S30, the second display part 70 implements the image signal, provided by the second optical induction part 60, as an image recognizable by the driver. In this case, an image signal provided by the first generation unit 51 may be recognized as a near image, and an image signal provided by the second generation unit 52 may be recognized as a far image.

An operation of the vehicle head-up display device 2 having the above-described configuration according to the second embodiment of the present disclosure is described below.

When the first generation unit 51 and the second generation unit 52 are disposed in the up and down directions (refer to FIG. 10), the image signal provided by the first generation unit 51 is reflected by the first lens unit 61, is moved downwards, passes through the second lens unit 62, is reflected upwards by the third lens unit 63, and reaches the second display part 70. In this case, the driver may recognize the vehicle state provided by the first generation unit 51. The image signal provided by the second generation unit 52 is reflected by the second lens unit 62, is moved to the third lens unit 63, is reflected upwards by the third lens unit 63, and reaches the second display part 70. In this case, the driver may recognize the road surface condition provided by the second generation unit 52. Meanwhile, the driver may recognize that the image provided by the second generation unit 52 is farther away than the image provided by the first generation unit 51.

When the first generation unit 51 and the second generation unit 52 are disposed in the left and right directions (refer to FIG. 11), the image signal provided by the second generation unit 52 is reflected by the fifth lens unit 65, passes through the sixth lens unit 66, is reflected upwards by the seventh lens unit 67, and reaches the second display part 70. In this case, the driver may recognize the road surface condition provided by the second generation unit 52. The image signal provided by the first generation unit 51 is reflected by the sixth lens unit 66, is reflected upwards by the seventh lens unit 67, and reaches the second display part 70. In this case, the driver may recognize the vehicle state provided by the first generation unit 52. Meanwhile, the driver may recognize that the image provided by the second generation unit 52 is farther away than the image provided by the first generation unit 51.

In the vehicle head-up display device and method according to the second embodiment of the present disclosure, the second image generation parts 50 provide the flat image recognized as a near image and the stereoscopic image recognized as a far image, which makes it possible to implement augmented reality in a head-up display.

The present disclosure has been described above with reference to the embodiments illustrated in the accompanying drawings, but the embodiments are merely for illustrative purposes. A person having ordinary knowledge in the art to which the present disclosure pertains will understand that various modifications and other equivalent embodiments are possible from the embodiments. Accordingly, the true technical scope of the present disclosure should be defined by the following claims.

What is claimed is:

1. A vehicle head-up display device comprising:
   a plurality of image generation parts disposed at a vehicle body and configured to provide an image signal including a planar image and a stereoscopic image;
   an optical induction part configured to guide, in a first direction, the image signal provided by the plurality of image generation parts; and
   a display part configured to implement the image signal guided by the optical induction part to produce an image recognizable by a driver,
   wherein the optical induction part includes:
      a first optical unit configured to guide the image signal in the first direction; and
      a second optical unit configured to receive the image signal guided in the first direction and reflect the received image signal in a second direction, different from the first direction, to the display part.

2. The vehicle head-up display device of claim 1, wherein the plurality of image generation parts include:
   a first image unit facing a first side of the optical induction part and configured to provide the planar image; and
   a second image unit inclined on a second side of the optical induction part and configured to provide the stereoscopic image.

3. The vehicle head-up display device of claim 2, wherein the first optical unit includes two triangular prisms conjoined together and coated with a transparent material.

4. The vehicle head-up display device of claim 3, wherein the first optical unit has a bonding region at which a reflective coating layer is disposed.

5. A vehicle head-up display device comprising:
   a plurality of image generation parts disposed at a vehicle body and configured to provide an image signal including a planar image and a stereoscopic image;
   an optical induction part configured to guide, in a first direction, the image signal provided by the plurality of image generation parts; and
   a display part configured to implement the image signal guided by the optical induction part to produce an image recognizable by a driver,
   wherein the plurality of image generation parts include:
      a first image unit facing a first side of the optical induction part and configured to provide the planar image;
      a second image unit facing a second side of the optical induction part and configured to provide the planar image; and
      a third image unit inclined on a third side of the optical induction part and configured to provide the stereoscopic image,
   wherein the optical induction part includes:
      a first optical unit including four triangular prisms conjoined together and coated with a transparent material, and configured to guide the planar and stereoscopic images provided from the first, second and third image units in the first direction; and
      a second optical unit configured to guide the image signal passing through the first optical unit to the display part, and
   wherein a first distance between the first image unit and the first optical unit is different from a second distance between the second image unit and the first optical unit.

6. The vehicle head-up display device of claim 5, wherein the first optical unit has a bonding region at which a reflective coating layer is disposed.

7. The vehicle head-up display device of claim 5, wherein the first and second distances are distances of light movement.

8. A vehicle head-up display device comprising:
   a plurality of image generation parts disposed at a vehicle body and configured to provide an image signal including a planar image and a stereoscopic image;
   an optical induction part configured to guide the image signal provided by the plurality of image generation parts; and a display part configured to implement the image signal provided by the optical induction part to produce an image recognizable by a driver, wherein the optical induction part includes:
a first optical unit configured to guide the image signal in a first direction; and
a second optical unit configured to receive the image signal guided in the first direction and reflect the received image signal in a second direction, different from the first direction, to the display part.

9. The vehicle head-up display device of claim 8, wherein the plurality of image generation parts include:
a first generation unit facing the optical induction part and configured to provide the planar image; and
a second generation unit inclined on the optical induction part and configured to provide the stereoscopic image.

10. The vehicle head-up display device of claim 9, wherein the first generation unit and the second generation unit are disposed vertically.

11. The vehicle head-up display device of claim 10, wherein the optical induction part includes:
a first lens unit configured to downwardly reflect the image signal provided by the first generation unit;
a second lens unit disposed below the first lens unit and configured to transmit light reflected by the first lens unit and reflect the image signal downwardly reflected by the second generation unit; and
a third lens unit configured to guide the image signal passing through the second lens unit to the display part.

12. The vehicle head-up display device of claim 9, wherein the first generation unit and the second generation unit are disposed respectively in opposite lateral directions.

13. The vehicle head-up display device of claim 12, wherein the optical induction part includes:
a first lens unit configured to reflect the image signal provided by the second generation unit;
a second lens unit disposed in front of the first lens unit and configured to transmit light reflected by the first lens unit and reflect the image signal provided by the first generation unit; and
a third lens unit configured to guide the image signal passing through the second lens unit to the display part.

14. A vehicle head-up display device comprising:
a plurality of image generation parts disposed at a vehicle body and configured to provide an image signal including a planar image and a stereoscopic image;
an optical induction part configured to guide the image signal provided by the plurality of image generation parts; and
a display part configured to implement the image signal provided by the optical induction part to produce an image recognizable by a driver, wherein the plurality of image generation parts include:
a first generation unit facing the optical induction part and configured to provide the planar image; and
a second generation unit inclined on the optical induction part and configured to provide the stereoscopic image,
wherein the first generation unit and the second generation unit are disposed vertically, and wherein the optical induction part includes:
a first lens unit configured to downwardly reflect the image signal provided by the first generation unit;
a second lens unit disposed below the first lens unit and configured to transmit light reflected by the first lens unit and reflect the image signal downwardly reflected by the second generation unit; and
a third lens unit configured to guide the image signal passing through the second lens unit to the display part.

15. A vehicle head-up display device comprising:
a plurality of image generation parts disposed at a vehicle body and configured to provide an image signal including a planar image and a stereoscopic image;
an optical induction part configured to guide the image signal provided by the plurality of image generation parts; and
a display part configured to implement the image signal provided by the optical induction part to produce an image recognizable by a driver, wherein the plurality of image generation parts include:
a first generation unit facing the optical induction part and configured to provide the planar image; and
a second generation unit inclined on the optical induction part and configured to provide the stereoscopic image, wherein
the first generation unit and the second generation unit are disposed respectively in opposite lateral directions, and
wherein the optical induction part includes:
a first lens unit configured to reflect the image signal provided by the second generation unit;
a second lens unit disposed in front of the first lens unit and configured to transmit light reflected by the first lens unit and reflect the image signal provided by the first generation unit; and
a third lens unit configured to guide the image signal passing through the second lens unit to the display part.

* * * * *